(No Model.)
C. A. SCHROYER.
STEAM TRAP.
No. 510,651.  Patented Dec. 12, 1893.
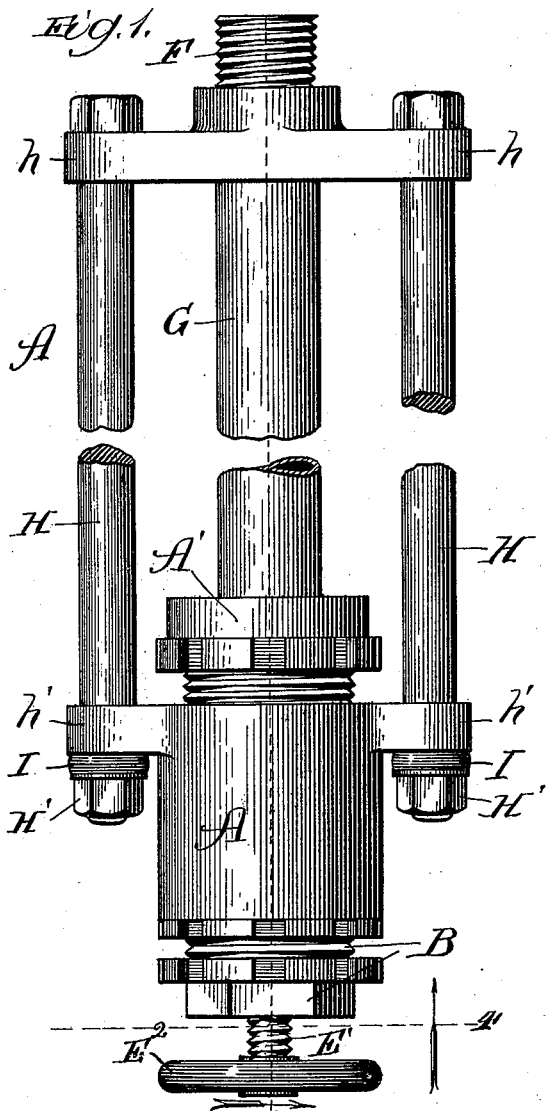
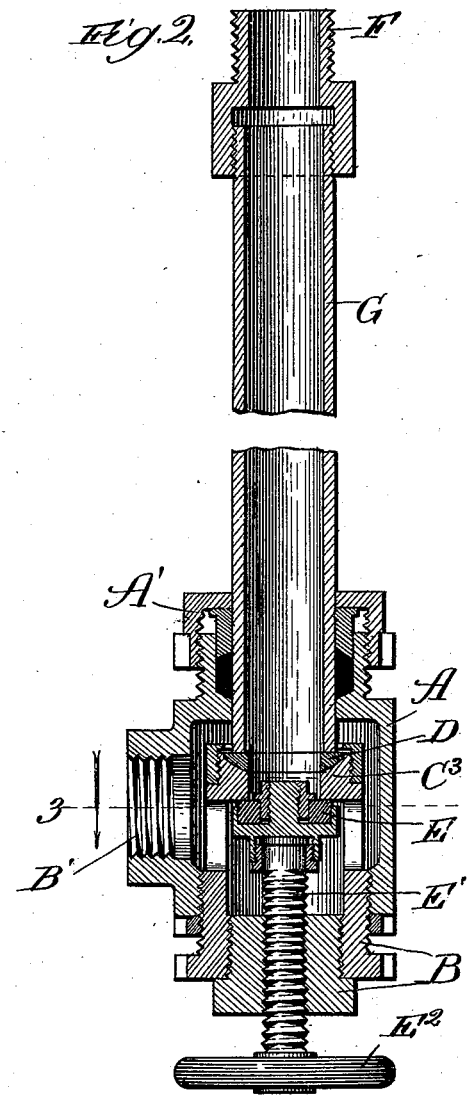
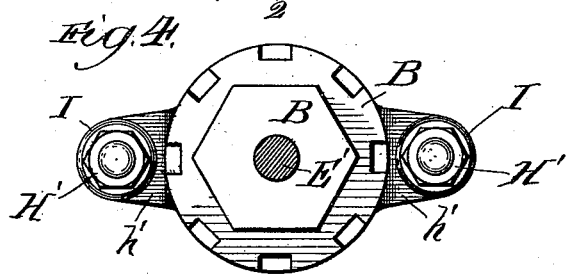
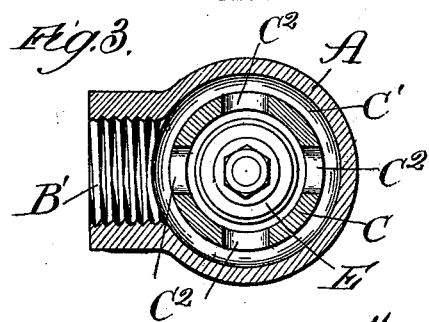
Witnesses:
Chas. Gaylord,
Clifford N. White.
Inventor:
Charles A. Schroyer,
By Banning & Banning & Payson,
Att'ys.

UNITED STATES PATENT OFFICE.

CHARLES A. SCHROYER, OF CHICAGO, ILLINOIS.

STEAM-TRAP.

SPECIFICATION forming part of Letters Patent No. 510,651, dated December 12, 1893.

Application filed February 3, 1893. Serial No. 460,865. (No model.)

*To all whom it may concern:*

Be it known that I, CHARLES A. SCHROYER, of Chicago, Illinois, have invented certain new and useful Improvements in Steam-Traps, of which the following is a specification.

The trap to which my invention relates, while adapted more particularly for use in connection with the steam heating systems upon railway cars, is nevertheless useful in other connections, and I contemplate so using it.

These traps of various constructions are well known and in general use, and the object of my invention is to modify and improve upon the former constructions in such a way as to produce what I consider a most efficient and serviceable trap.

The traps with which I am acquainted have heretofore been used upon the outside of the car, the disadvantage of which location will be obvious. A trap provided with my improvements is capable of being placed and operated within a car, thereby avoiding the objections incident to the other style.

My invention consists in the features, combinations and details of construction hereinafter described and claimed.

In the drawings, Figure 1 is a plan view, partly broken, of a steam trap embodying my improvements; Fig. 2 a section on line 2 of Fig. 1; Fig. 3 a section on line 3 of Fig. 2; and Fig. 4 a section on line 4 of Fig. 1, all the other sections being taken in the direction indicated by the respective arrows.

The shell or case, A, of the trap is made preferably of the form shown more particularly in Figs. 2 and 3. At one end it is provided with a stuffing box, A', of any suitable construction, and at the other with adjustable screw plugs B. It is further provided with an outlet B'. This shell or casing is provided with an interior wall C, whereby an annular channel C' is formed between the outer casing and the inner wall, this inner wall being further provided with ports $C^2$ for the purpose hereinafter described. The upper end of the wall, C, is thickened as shown at $C^3$, and is concaved or hollowed, and against it rests a valve seat D, which is so formed as to fit upon the concaved surface of the wall, thereby forming a ball and socket joint. This valve seat, as shown, is made in the form of a ring, allowing steam and water to pass through it and escape through the ports $C^2$, as hereinafter to be described. Bearing against the lower face (Fig. 2) of this thickened portion $C^3$, which acts as a valve seat, is a valve E operated by means of a rod E' and hand wheel $E^2$, the rod being screw-threaded and screwing through the plug B, as shown. The valve E is also preferably made in several parts secured together by screw threads, in such a manner as to admit of its proper adjustment.

F represents the steam pipe connection. Screwing into this is a tube G, made of brass or other suitable expansible material, the other end of which passes through the stuffing box A', and enters the casing of the steam trap. When this tube expands sufficiently, it is brought in contact with the valve seat D, and when it contracts, it withdraws from such valve seat, permitting the steam and water of condensation to escape through the passage C' and opening B'.

To hold the parts of the device together, I provide rods H, which pass through lugs, $h$, $h'$, on the pipe connection and the casing of the trap. These rods carry nuts H' at their ends, whereby they may be regulated and adjusted, and to prevent the device being broken or injured by any undue expansion of the tube G, I insert washers or plugs of rubber or other elastic material, I, between the lugs $h'$ and the nuts H', whereby an extra amount of movement is afforded. This extra movement is important for the following reasons: With these steam traps as heretofore constructed, there being no such movement provided for, any unusual expansion will cause the expansible tube to bend, thereby lessening the efficiency of the trap, and preventing the formation of a tight joint between the expansible tube and its seat. This buckling is prevented by the use of the elastic washers herein described, which, while not sufficiently yielding to prevent the formation of a tight joint between the tube of the valve and its seat, will yield under such expansive force as might otherwise cause the tube to buckle.

The device is preferably normally set to act at any temperature exceeding 100° Fahrenheit. The expansion tube will remain in contact with the valve seat, and this seat having a ball and socket joint, a perfect and water tight contact between it and the expansion tube is insured under all circumstances. When, however, the temperature falls to 100°, or below this point, the pipe will contract, leaving an opening between itself and the valve seat for the escape of the water of condensation, as above pointed out. It should, of course, be understood that the parts may be set to operate at any temperature, and I have only described 100° as a desirable temperature. If it be desired to draw off the water of condensation when the expansion pipe is in contact with the valve C, this may be done by opening the valve E, when the water can escape through the ports $C^2$ and B'. This valve should be opened when it is necessary to shut off the engine or detach cars, as this gives an open port from all the radiating pipes. In this way I provide an exceedingly efficient steam valve which operates readily and automatically, which is provided with means for compensating for all the movements of the various parts, and which is adapted to be located and operated within the railway car.

I claim—

1. A steam trap comprising a casing, provided with suitable ports, a movable valve seat mounted upon substantially a ball and socket joint within such casing, and an expansion tube connected with the steam pipe, entering the casing and adapted when expanded to contact with such valve seat, substantially as described.

2. A steam valve comprising a casing provided with suitable ports and a ball and socket valve seat, an expansion pipe connecting with the steam pipe, entering the casing and adapted as it expands and contracts to contact with the valve seat and to withdraw therefrom, and a suitably operated valve, E, whereby the water may be discharged when the outlet between the expansion pipe and the outlet is closed, substantially as described.

CHARLES A. SCHROYER.

Witnesses:
GEORGE S. PAYSON,
SAMUEL E. HIBBEN.